United States Patent
Müller et al.

(10) Patent No.: US 12,112,454 B2
(45) Date of Patent: Oct. 8, 2024

(54) BRIGHTNESS AND COLOR CORRECTION OF IMAGE DATA OF A LINE CAMERA

(71) Applicant: Sick AG, Waldkirch (DE)

(72) Inventors: Romain Müller, Waldkirch (DE); Marcel Pfeifer, Waldkirch (DE)

(73) Assignee: SICK AG, Waldkirch (DE)

( * ) Notice: Subject to any disclaimer, the term of this patent is extended or adjusted under 35 U.S.C. 154(b) by 440 days.

(21) Appl. No.: 17/703,139

(22) Filed: Mar. 24, 2022

(65) Prior Publication Data

US 2022/0343478 A1 Oct. 27, 2022

(30) Foreign Application Priority Data

Apr. 23, 2021 (DE) .......................... 102021110388.6

(51) Int. Cl.
| | |
|---|---|
| *G06T 5/50* | (2006.01) |
| *H04N 1/60* | (2006.01) |
| *H04N 23/56* | (2023.01) |
| *H04N 23/72* | (2023.01) |

(52) U.S. Cl.
CPC .............. *G06T 5/50* (2013.01); *H04N 1/6008* (2013.01); *H04N 23/56* (2023.01); *H04N 23/72* (2023.01); *G06T 2207/10024* (2013.01); *G06T 2207/20024* (2013.01)

(58) Field of Classification Search
CPC ............. G06T 5/50; G06T 2207/10024; G06T 2207/20024; H04N 23/56; H04N 23/72; H04N 1/6008
USPC ......................................................... 382/167
See application file for complete search history.

(56) References Cited

U.S. PATENT DOCUMENTS

| | | | |
|---|---|---|---|
| 2002/0100863 A1* | 8/2002 | Spears | H04N 1/00023 250/208.1 |
| 2010/0302368 A1* | 12/2010 | Jeon | B62D 15/0295 382/104 |
| 2010/0316291 A1 | 12/2010 | Deng et al. | |
| 2012/0002066 A1 | 1/2012 | Wang | |
| 2012/0008863 A1* | 1/2012 | Sawada | H04N 23/88 382/167 |

(Continued)

FOREIGN PATENT DOCUMENTS

| | | |
|---|---|---|
| DE | 10200652 A1 | 8/2002 |
| DE | 102015116568 A1 | 3/2017 |
| DE | 202019106363 U1 | 3/2021 |

(Continued)

*Primary Examiner* — Gabriel I Garcia
(74) *Attorney, Agent, or Firm* — Nath, Goldberg & Meyer; Jerald L. Meyer (57) ABSTRACT

A method for brightness and color correction of image data of a line camera is disclosed, wherein, for the detecting of image data with at least two line arrays of the line camera while illuminating a detection area of the line camera with an illumination module, a gray-scale image and at least two single-color images are recorded, and the image data is corrected with the help of a brightness function of the illumination module which is dependent on a line position of the line array and/or a distance of recorded objects. The brightness function is determined for the illumination module in advance and independent of the line camera and is stored in the illumination module, and the brightness function is read out by the line camera and used for the respective correction of the gray-scale image and the single-color images.

19 Claims, 6 Drawing Sheets

(56) References Cited

U.S. PATENT DOCUMENTS

2015/0138611 A1  5/2015  Golding et al.

FOREIGN PATENT DOCUMENTS

| EP | 3012778 | A2 | 4/2016 |
| EP | 2176641 | B1 | 7/2018 |

* cited by examiner

BRIGHTNESS AND COLOR CORRECTION OF IMAGE DATA OF A LINE CAMERA

The present invention relates to a method for brightness and color correction of image data of a line camera and to a camera which applies this method.

The image data of a line camera is used in many industrial and logistic applications. This means that various processes can be automated. Besides diverse measuring, manipulation and inspection tasks, the automatic sorting of objects based on codes is known and these are read with the help of the image data. For this purpose, barcodes and various two-dimensional codes are read, such as a Maxi-code or an Aztec-code, or also labels which are decoded using text recognition (OCR).

In a typical application situation, such as on a production line, baggage handling in airports, or automated sorting of packages in logistic centers, the objects are conveyed past the camera and image data of the objects having the codes arranged on them is obtained by scanning them line by line. The individual image lines are put together based on the known or measured belt speed. Line cameras achieve a high resolution and speed.

Often, conventional line cameras record a monochrome image, also known as a gray-scale or black-and-white image. With it, the best photon yield and therefore the best signal-to-noise ratio is achieved, and color detection is of no interest for many evaluations including the reading of codes that anyhow have only light and dark areas. If however, color information is to be obtained, matrix cameras are normally referred to. However, this has disadvantages especially for fast belt applications, because a high frame rate is required, and the stitching of their individual images is computationally very intensive compared to the simple lining up of image lines. In addition, a matrix image sensor cannot achieve the same number of pixels in the line direction as a line image sensor.

The most common way to configure a matrix image sensor for color capture is to provide pixel by pixel respectively two green, one red and one blue filter in a Bayer pattern. However, there are also alternative color patterns that, for example, add a white channel (RGBW) or use subtractive primary colors, such as red, yellow and blue (RYBY).

Color line cameras are also known. For example, they have three lines in red, green and blue (RGB), or an alternating arrangement of these primary colors on a single line or imitate the Bayer pattern by having one line of alternating red and blue pixels and a second line of pure green. The disadvantage of all these color image sensors is that received light is lost through the color filters and therefore, a black-and-white image remains superior for applications having high resolution requirements such as code reading. Therefore, the color information can only be obtained at the cost of poorer performance compared to a black-and-white evaluation.

Furthermore, a line camera is subject to dynamic variation in its application situation. Dependencies on ambient light are largely eliminated by an active illumination and, if necessary, by shielding. However, the illumination itself and the image recording are still always variable from object to object. This is mainly due to the respective object distance and inhomogeneities such as vignetting in the line direction. To compensate for these, it is known to measure an integrated illumination and to teach-in brightness dynamics on-site. However, this leads to a large calibration effort. In addition, the brightness dynamics and non-uniform spectral characteristics of the illumination are much more disturbing in a color recording because the recorded colors shift as a result, but this has not yet been compensated for.

DE 102015 116 568 describes color detection through the combination of a monochrome camera with a tunable color filter. However, as a result, too much time is lost in recording and with respect to a monochrome camera, a level of reception is missing due to the color filter.

In EP 3 012 778 A2 a double line camera is described which is driven by a multi-spectral lighting. This is effectively nothing more than also a color filter that is now generated elsewhere but does not prevent the loss of time and light.

From US 2010/0316291 A1 and US 2012/0002066 A1 a respective code reading device is known that records images with a pixel matrix. Most of the pixels are monochrome and colored pixels are interspersed in a grid arrangement. These colored pixels form a Bayer pattern.

DE 20 2019 106 363 U1 discloses a code reader for reading optical codes which uses at least a double line as an image sensor of which, receiving pixels of at least one line are sensitive to white light and receiving pixels of the remaining line are sensitive to only one color. This, then allows a gray-scale image and a color image to be recorded. In some embodiments, a primary color is reconstructed from the gray-scale image and two other primary colors. However, the color correction is incomplete, and the color image still shows noticeable deviations in color.

Therefore, it is the object of the present invention to improve the recording of color image data.

This object is achieved by a method for brightness and color correction of image data of a line camera, sometimes also referred to as line scan camera, and by a camera, in particular a line camera or line scan camera, which uses this method. The line camera comprises a line-shaped image sensor having a plurality of line arrays of light-receiving pixels. By a plurality of line arrays is meant a small number of at least less than ten. The resolution in the line direction and therefore the number of light-receiving pixels in the line direction is orders of magnitude higher and is several hundred, thousand or more. While an illumination module illuminates a detection area of the line camera, a gray-scale image and at least two single-color images are recorded. A single-color image is an image of a specific color, for example blue or red. For this purpose, the light-receiving pixels have different spectral sensitivities, in particular due to color filters or the omission thereof. Groups of light-receiving pixels with a certain spectral sensitivity can each be considered as part of a recording channel, a mono channel for the gray-scale image and several color channels for the single-color images.

The image data is corrected with a brightness function of the illumination module. The brightness function depends on up to two variables, on the line direction along a line array designated for example by X, or on the distance direction of the recorded objects designated for example by Z, or in particular depends preferably on both. In discretized form, the brightness function may be represented by a brightness vector or a brightness matrix. The brightness function may be used directly for correction, or it may be incorporated into more complex corrections, which will be described below with reference to advantageous embodiments.

The invention is based on the basic idea of determining in advance the brightness function, for example in the final production of the illumination module, and to store it in the illumination module. This can even be done completely independent of the line camera since at this point a connection between a particular line camera and the illumination module is preferably not even known. Later in operation, the line camera together with the illumination module is used to then read out the brightness function from the illumination module, and the line camera uses it directly for brightness and color correction, or the line camera generates its own correction function from the brightness function stored in the illumination module and uses it in further operation. The brightness function is used for a correction in the mono channel and the color channels respectively, i.e. on the gray-scale image and the single-color images. A brightness correction in a color channel is automatically also a color correction, since it shifts the mutual weighting of the colors. In further advantageous embodiments, the mono channel is included for a reconstruction of colors so that also its brightness has influence on the color. Additional advantageous color corrections may be added, which also will be described further on.

The invention has the advantage that a gray-scale or black-and-white image is detected in full resolution with high contrasts and the best possible signal-to-noise ratio. At the same time, color information is obtained that may be used for various additional or alternative evaluations. This additional color detection is not at the expense of the resolution or the signal-to-noise ratio of the gray-scale image. According to the invention, it is possible to compensate the illumination spectrum of the illumination module. The illumination module is initially independent of the camera and can be calibrated independently. This facilitates the commissioning or maintenance, as the camera adapts itself to the illumination module used with it. There is no need to carry out teaching-in of the illumination characteristics on site, which would involve some effort and expert knowledge.

Depending on the embodiment, the distribution of the light-receiving pixels with their respective color-selective light sensitivity over the line arrays of the line camera varies. Preferably, the light-receiving pixels of the mono channel for the gray-scale image form at least one complete line, which may be referred to as a white line. These light-receiving pixels are sensitive to white light, which should mean that they perceive the entire optical spectrum and for example, have no color. Of course, the unavoidable hardware limitations of the camera pixels used constitutes the limit of the received light. The distribution of the light-receiving pixels of a color channel and thus the recording of a respective single-color image with sensitivity for only one color may form different patterns, which differ depending on the embodiment. Line arrays for the color channels may be referred to as a color line as opposed to the white line. In general, white pixels may once again be interspersed in a color line, but the white line is in itself responsible for such image information.

Preferably, two, three or four line arrays are provided, of which one or two line arrays are white lines. The said numbers here are exact and not a minimum requirement. With few line arrays, a particularly compact structure of the image sensor is achieved. The minimum embodiment is a double line with one white line and one color line, wherein the color line then supports at least two color channels by a pattern of light-receiving pixels with respective sensitivity for one of at least two different colors. To achieve a higher resolution of the color image in the line direction, at least two color lines are preferably provided.

The light-receiving pixels within a color line are preferably sensitive to the same color. In other words, an entire color line is uniform, for example a red line or a blue line. Thus, the corresponding color information is detected in full resolution. The light-receiving pixels within a color line may also be sensitive to different colors, in particular, in an alternating sequence such as red-blue-red-blue. Furthermore, it is conceivable to combine together uniform color lines and mixed color lines.

The gray-scale image is preferably used for reading codes, i.e. the content encoded in the code is read out. The gray-scale image has the full resolution and the best possible signal-to-noise ratio, so that code reading is possible with the same quality as with a conventional monochrome line camera. At the same time, color information can be provided without affecting the decoding result. This color information may be used for arbitrary functions, but also for functions related to code reading, for example, an initial segmentation or the finding of code regions.

A color image is preferably generated from the single-color images. A color image in conventional language is an image with colors as normally recognizable by the human eye such as RGB, and is distinguished from a single-color image that contains, for example, only the red color information. If all the primary colors are detected as single-color images, it is sufficient to combine them into the color image. Besides, it is conceivable to reconstruct one of the primary colors from the others. Particularly preferred is the use of the color image in the context of code reading and for its support, in order to identify, classify and/or distinguish from the image background code-carrying objects and/or code regions. Often, the code underground differs in color from the surrounding area, or the color information may be used to identify a code-carrying object and separate it from the background. Alternatively, the color image is used for some other function, in particular it is output as such and is then only used downstream, be it for visualization and diagnostic functions or for completely different additional tasks. Thus, the two functions of recording a gray-scale image particularly suitable for code reading and a color image useful for supporting this or for other purposes, are combined in a method and a device, whereby the primary function of code reading is not impaired by the additional color image recording. The gray-scale image may be used additionally or alternatively for purposes other than code reading.

Preferably, a gray-scale image and a color image are generated. Thereby, both images are available for the decoding or other functions. The color image preferably has a lower resolution than the gray-scale image. The high-resolution gray-scale image of the white line is already available for evaluations that are demanding in terms of resolution, such as code reading. The lower resolution may already occur originally due to too few or too many light-receiving pixels of a respective color in the line direction. Alternatively, a binning or down-sampling takes place at the hardware or software level.

Preferably, image lines recorded during a relative movement between the line camera and the objects or codes to be recorded are combined to an overall image. Alternatively, in the case of bar codes, a code reading from a single line-shaped recording is conceivable, however also bar codes are preferably read from such a combined two-dimensional overall image.

The brightness function is preferably modified each time by means of a color normalization function for the color of the single-color image, so that the correction for the gray-scale image and the single-color images is respectively carried out with its own brightness function, whereby a color normalization function for different line positions and distances sets the brightness of the illumination module in its color in proportion to the brightness across the entire spectrum. The color normalization function reproduces the spectral differences of the illumination module preferably in the same dimensions of line direction X and/or distance direction Z as the brightness function. In discretized form, the color normalization function can be represented as a matrix or vector. The resolution of the color normalization function and the brightness function may be different, which can then be adjusted, for example by interpolation. If the color normalization function and the brightness function are mixed per color channel, the result is a color-adapted and normalized improved or modified brightness function. The brightness function for the mono channel or the gray-scale image does not need any normalization, a corresponding gray normalization function would only consist of ones and would not change anything, since here the gray value for the brightness would be in relation to itself over the whole spectrum. The modification of the brightness function with the color normalization functions is preferably carried out during the commissioning, after the camera has read out the brightness function from the illumination module, and thereafter, the modified brightness function is stored in the line camera for using for brightness and color correction in further operation.

The color normalization function is preferably determined in advance generally for the type of illumination module. In this embodiment, it is assumed that the series used, or the type of illumination module at least shows a reasonably stable spectral performance across devices. The color normalization functions are determined once, not per illumination module. Deviations are accepted as tolerances. These color normalization functions may be stored either in the illumination module or in the line camera, since they do not depend on the specific illumination module, but only on its type.

The color normalization functions are preferably determined individually for the illumination module in advance. In this alternative embodiment, the color normalization functions are likewise device-specific as in the brightness function and are also stored in the illumination module for later use in the line camera. Preferably, the color normalization functions, and the brightness function are learned-in in the same process, for example by using color-sensitive light receivers during the calibration measurement of the brightness function in different X and/or Z directions.

The brightness function is preferably refined based on optical parameters of the line camera. The brightness function stored in the illumination module preferably has only a low resolution of, for example, around the ten level in the X and/or Z direction. This reduces the effort required in the calibration of the illumination module if the brightness function is to be initially stored there. Later, at the operating location, the line camera reads-in this still rather coarsely resolved brightness function and converts it into a higher resolution brightness function using an optical model in which optical parameters such as focal length, aperture and the like are entered. Preferably, the brightness function is first mixed with the color normalization functions to obtain a brightness function per mono channel and color channel, and this brightness function obtained for each channel is subsequently refined. Since the brightness functions are already then normalized, the same algorithm for refinement may be used in the mono channel and in the color channels. However, it is also conceivable to use an algorithm for refinement adapted for color per se or even for each color in the color channels.

The gray-scale image and the single-color images are preferably recorded with different analog and/or digital gains. Due to the color filters, the level in the color channels is typically lower, and this can be compensated for by an amplification. In this case, all colors can be increased with the same amplification factor or are amplified differently among one another. If the hardware allows, the best signal quality is achieved by analog amplification. Digital amplification may be considered by a point-by-point scaling with the desired amplification factor in the brightness function or in the color normalization function.

Preferably, two single-color images are recorded in two from three primary colors. Here, there is one mono channel and two color channels each of a different primary color. Accordingly, the colored lines of the line camera have light-receiving pixels that are respectively sensitive to one of the two primary colors and there are no light-receiving pixels that are sensitive to the third primary color. The primary colors are the additive primary colors red, green and blue or the subtractive primary colors blue-green (cyan), purple (magenta) and yellow. In that only two of these are provided, light-receiving pixels and line arrays are spared. Alternatively, it would be conceivable to have all three respective primary colors (RGBW, CMYW).

The third primary color is preferably reconstructed from the gray-scale image and the two single-color images. The white line records a superposition of all primary colors, so that the third primary color can be isolated when the other two primary colors are recorded. Nevertheless, with naive direct subtraction the colors would be distorted beyond recognition, especially if the spectrum of the illumination module is inhomogeneous. However, according to the invention, the colors are maintained thanks to the explained correction with the brightness function preferably taking into account color normalization functions. An additional advantageous color correction will be explained in the following.

The two primary colors are preferably red and blue. In general, additive primary colors lead to better results. Especially green, which is provided twice in the Bayer pattern, is not recorded in this preferred embodiment, so that for this color no light-receiving pixels and line arrays need to be provided. If required, green is generated from the white line and the red and blue color information. Graphically, green is reconstructed from G=3*W-R-B, whereby this leads only to satisfactory results with the brightness and color correction according to the invention. The selection of the primary colors red and blue is particularly advantageous if the illumination module has a weaker intensity in the green spectrum.

Preferably, corrected color values of a color image are formed from linear combinations of respective gray values of the gray-scale image and single-color values of the single-color images with color correcting weighting factors. The weighting factors are static and are determined empirically in order to achieve a good color impression with this additional color correction. In this particular context, the image information detected with the white line is also considered as color and is therefore also included in the linear combinations, in case a primary color is reconstructed from the white line or rather the gray-scale image.

Preferably, corrected RGB values R'G'B' are formed as a gray-scale image with gray values W, a red image with red values R and a blue image with blue values B are formed as $$R'=x_1*R+x_2*(3*W-R-B)+x_3*B+x_4,$$

$$G'=x_5*R+x_6*(3*W-R-B)+x_7*B+x_8 \text{ and}$$

$$B'=x_9*R+x_{10}*(3*W-R-B)+x_{11}*B+x_{12}$$

with weighting factors $x_1 \ldots x_{12}$. This is a simple and clear computation instruction, whose manageable number of weighting factors $x_1 \ldots x_{12}$ is at the same time determined with reasonable effort and is flexible enough for a good color correction. Here, again, the preferred pair of single-color images in red and blue is recorded. For other primary colors, the above equations could be analogously specified with substitutions. Individual or a number of the weighting factors may be zero, especially the offsets $x_4$, $x_8$, $x_{12}$.

The corrected color values are preferably determined with a neural network.

Therefore, no weighting factors need to be determined manually, but rather this is learned-in automatically based on sample data. The necessary data sets with the color requirements which are learned-in as correct, may be specified via reference patterns. Particularly preferred, is that the training is carried out based on color images from at least one additional color-sensitive or preferably color-calibrated sensor. The additional color sensor is required only once, for example at the manufacturing site, so that its one-off costs are not so significant, and it generates in an easy manner labeled training data of the required quality and quantity.

The method according to the invention may be further embodied in a similar manner and showing similar advantages. Such advantageous features are described by way of example, but not exhaustively, in the dependent claims following the independent claims.

The invention is explained in more detail below also with respect to further features and advantages by way of example with reference to embodiments and with reference to the accompanying drawing. The figures in the drawing show in.

Figure 1:
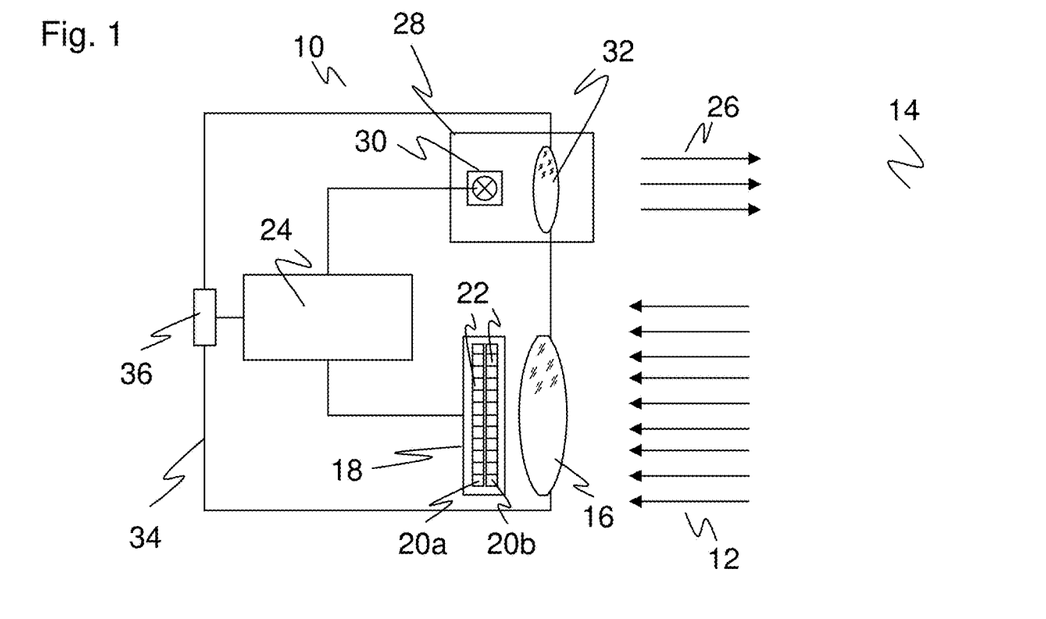
FIG. 1 a schematic sectional view of a line camera.

FIG. 1 shows a very simplified block diagram of a line camera 10, which is preferably configured as a code reader for reading one- or two-dimensional optical codes. The line camera 10 detects received light 12 from a detection area 14 through a photographic lens 16, represented here only by a simple lens. A line-shaped image sensor 18 generates image data of the detection area 14 and the objects and code regions as necessary that are present there. The image sensor 18 has at least two lines 20a-b of light-sensitive receiving pixels 22, whereby in the line direction, preferably a plurality of hundreds, thousands or even more receiving pixels 22 are provided.

The image data of the image sensor 18 is read out by a control and evaluation unit 24. The control and evaluation unit 24 is implemented in one or more digital components, for example microprocessors, ASICs, FPGAs or the like, which may also be provided in whole or in part outside the line camera 10. A preferred part of the evaluation is to put together detected image lines as an overall image. Otherwise, during the evaluation, the image data may in preparation be filtered, smoothed, tailored to specific areas or binarized. According to the invention, a brightness or color correction is provided, which will be explained in more detail further on in reference to FIGS. 7 to 14. In a preferred embodiment of the line camera 10 as a code reader, a segmentation is typically performed in which individual objects and code regions are found. The codes in these code regions are then decoded, that is, the information contained in the codes is read out.

In order to illuminate the detection area 14 sufficiently brightly with transmitted light 26, an illumination module 28 having a light source 30, typically a plurality of light sources such as in the form of LEDs as well as transmission optics 32 is provided. The illumination module 28 is shown in FIG. 1 within a housing 34 of the line camera 10. This is a possible embodiment in which the illumination module 28 is inserted into a suitable slot of the line camera 10 later in production or even into the finished device after production, for example at the site of operation. Alternatively, the illumination module 28 has its own housing or is an external device and is connected to the line camera 10 for operation.

Data can be output at an interface 36 of the line camera 10, namely, read code information as well as other data in various processing stages, such as raw image data, pre-processed image data, identified objects or code image data not yet decoded. On the other hand, it is possible to parameterize the line camera 10 via the interface 36 or a further interface.

Figure 2:
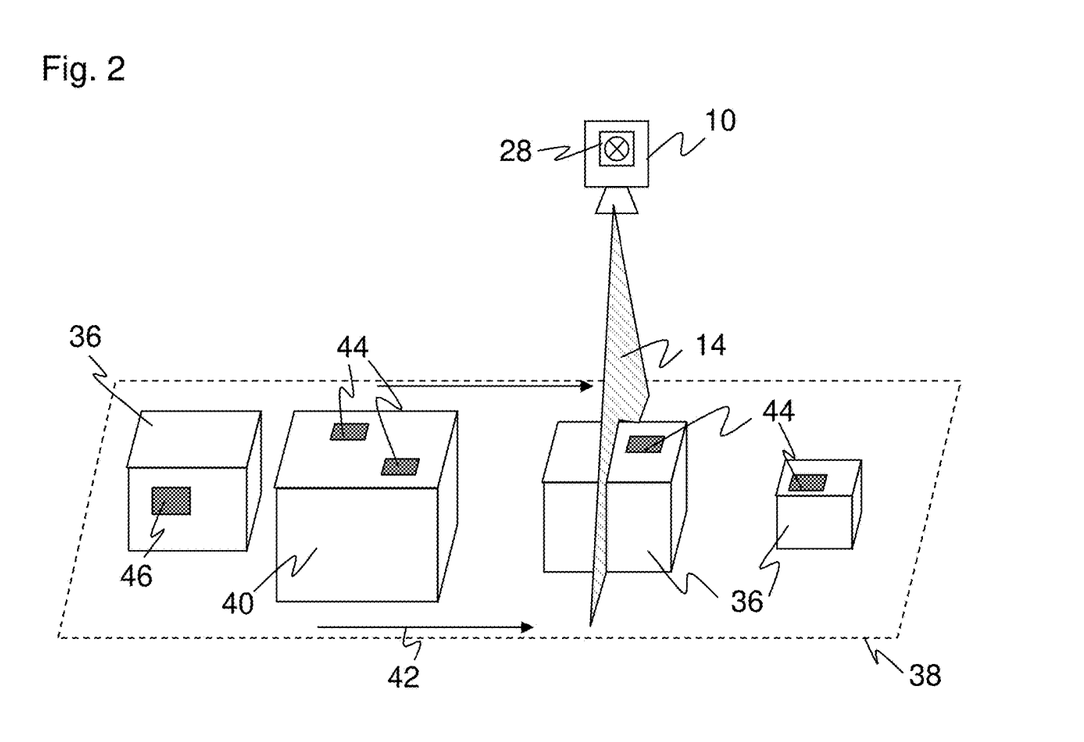
FIG. 2 a three-dimensional view of an application of the line camera in fixed mounting above a conveyor belt with objects, in particular for code reading.

FIG. 2 shows a possible application of the line camera 10 mounted on a conveyor belt 38 that conveys objects 40 in a conveying direction 42 as indicated by the arrow, through the detection area 14 of the line camera 10. The objects 40 may carry code regions 44 on their outer surfaces. The task of the line camera 10 in this example application as a code reader, is to identify the code regions 44, read out the codes attached there, decode them and assign them to the respective associated object 40. In order to also identify code regions 46 attached to the side, preferably several line cameras 10 having different perspectives are used. Additional sensors may be added, for example, an upstream laser scanner for detecting the geometry of the objects 40 or an incremental encoder for detecting the speed of the conveyor belt 38. Stationary mounting of the line camera 10 on a conveyor belt 38 with objects 40 is also conceivable in image evaluation applications other than code reading.

The detection area 14 of the line camera 10 is a plane with a line-shaped reading field corresponding to the line-shaped image sensor 18. Accordingly, the illumination module 28 generates a line-shaped illumination area that, apart from tolerances, corresponds to the reading field. In FIG. 2, the illumination module 28 is shown simply and purely schematically as a block within the line camera 10. As mentioned above, the illumination module 28 may be an external device. By recording line by line the objects 40 in the conveying direction 42, an overall image of the objects 40 which have conveyed past, together with the code regions 44, is gradually formed. The lines 20a-b lie so close to one another that they practically detect the same object section. Alternatively, an offset can also be computationally compensated for.

The line camera 10 detects with its image sensor 18, on the one hand, a gray-scale image or a black-and-white image that is used for code reading. In addition, color information or a color image is also obtained. The color information may be used for a variety of additional functions. One example is the classification of objects 40, for example to find out whether it is a package, an envelope or a bag. It can be determined if a conveyor belt container is empty, such as the tray of a conveyor-tray or a box. Segmentation of the image data into objects 40 or code regions 44 can be performed based on, or supported by, the color information. Additional image recognition tasks may be solved, such as the recognition of specific imprints or labels, for example for hazardous goods labeling, or fonts can be read (OCR, Optical Character Recognition).

FIGS. 3 to 6 show some examples of embodiments of the image sensor 18 for such detection of black-and-white images and color information. Common to these embodiments is that at least one of the lines 20a-d is a white line whose receiving pixels 22 detect light across the whole spectrum within the limits of the hardware. At least one other line 20a-d is a color line whose receiving pixels 22 are only sensitive to a particular color, in particular due to appropriate color filters. The distribution of colors over the respective receiving pixels 22 of the colored lines differs depending on the embodiment but deviates from the usual RGB and in particular from a Bayer pattern. Providing at least one complete white line is preferred because it allows a full resolution gray-scale image to be recorded. In addition, a separation into white and colored lines is clearer. In general, however, differing patterns of white and colored receiving pixels 22 mixed among the lines 20a-d are conceivable. The respective receiving pixels 22 of the same spectral sensitivity are combined in a mono channel for the gray-scale image or in a respective color channel for a single-color image, for example for red-sensitive receiving pixels 22 in a red-color channel for a red image and for blue-sensitive receiving pixels 22 in a blue-color channel for a blue image.

Figure 3:
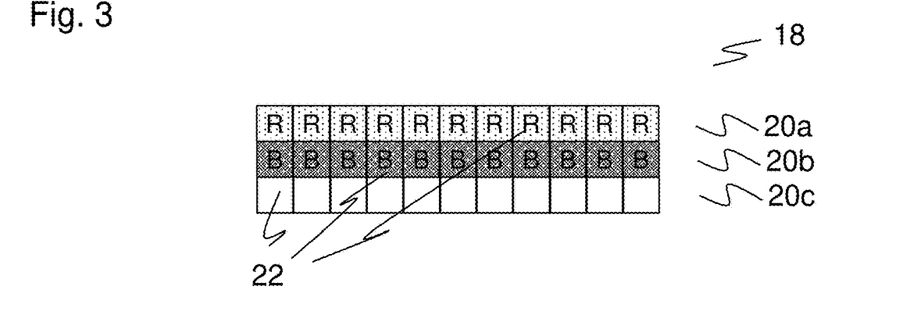
FIG. 3 a schematic representation of a line-shaped image sensor with a red line, a blue line and a white line.
Figure 4:
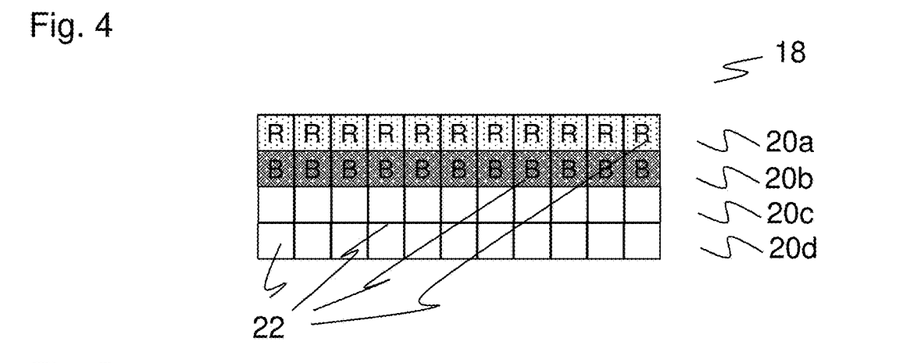
FIG. 4 a schematic representation of a line-shaped image sensor with a red line, a blue line and two white lines.

FIG. 3 shows an embodiment with one red line 20a, one blue line 20b and one white line 20c each. The lines 20a-c are therefore homogeneous and the receiving pixels 22 within a line 20a-c are sensitive to the same optical spectrum. FIG. 4 shows a variation with an additional white line 20d.

Figure 5:
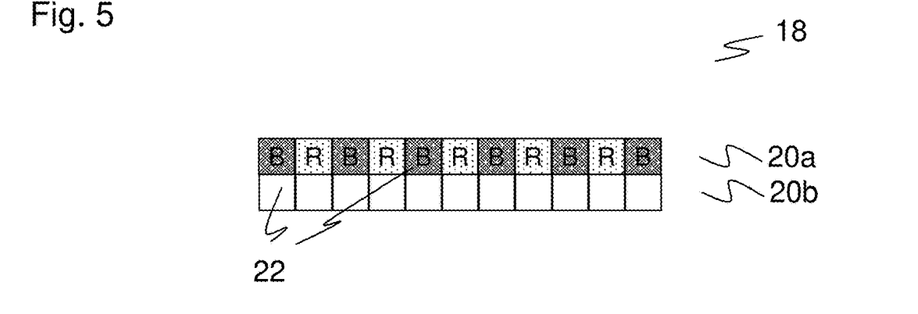
FIG. 5 a schematic representation of a line-shaped image sensor with an alternating red-blue line and a white line.
Figure 6:
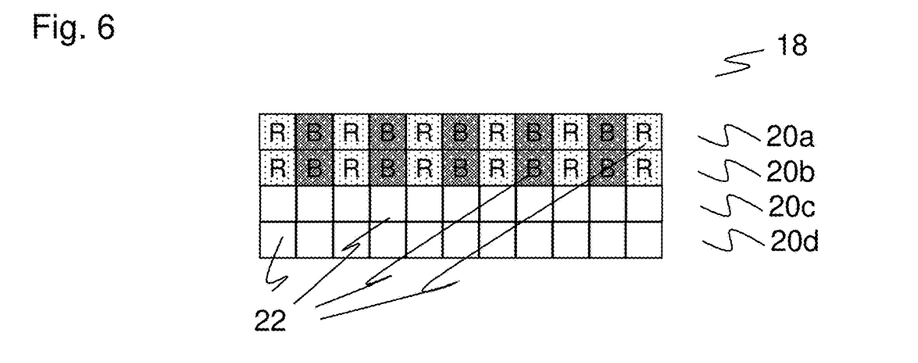
FIG. 6 a schematic representation of a line-shaped image sensor with two alternating red-blue lines and two white lines.

In the embodiment shown in FIG. 5, receiving pixels 22 sensitive to red and blue are alternately mixed within a color line 20a. Thus, in combination with a white line 20b, a structure with a total of only two lines is possible. FIG. 6 shows a variation in which both the color line 20a-b and the white line 20c-d are doubled.

While for code reading, the high resolution of the white line is desired, in many cases the color information is only needed in a lower resolution. Therefore, a certain loss of resolution in the colored lines as in FIGS. 5 and 6 may, under the circumstances, not be disturbing at all. In some cases, it is even conceivable to artificially reduce the resolution by merging pixels (binning, down-sampling) and thus improve the signal-to-noise ratio.

These examples are only a selection based on the primary colors red and blue with white (RBW). Further embodiments use other color filters and colors. Thus, also the use of green with red or blue (RGW, BGW) or all three primary colors (RGBW) would be conceivable. Furthermore, the subtractive primary colors blue-green (cyan), purple (magenta) and yellow in analogous combinations may also be considered (CMW, CYW, MYW or CMYW).

The raw image data of the different colored receiving pixels 22 are in many respects too unbalanced to provide colors that can be used. This is firstly due to the spatial detection situation, since an object 40 at a great distance and at the edge of the lines 20a-d is exposed to a different illumination intensity than a close, central object 40. Accordingly, there is a spatial dependence in an X-direction of the lines 20a-d and in a Z-direction of the object distance. Moreover, the illumination module 28 has spectral characteristics in which the levels of brightness in the different wavelength ranges differ significantly from each other, especially when using semiconductor light sources such as LEDs. Furthermore, the spatial and spectral characteristics across the individual illumination modules 28 are scattered due to, for example, batch differences of the light sources 30 and other tolerances. In the following, various advantageous embodiments describe a brightness and color correction that compensates for the individual fluctuations of the illumination module 28 and/or general spectral and spatial fluctuations.

Figure 7:
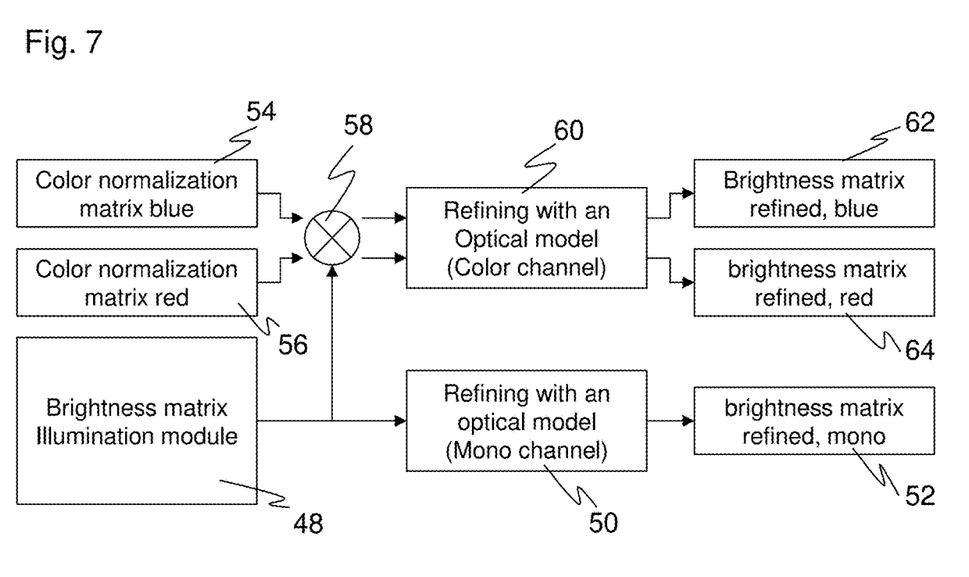
FIG. 7 an exemplary flow chart for the generation of normalized gray-scale and single-color images.

FIG. 7 shows an exemplary flow chart for the generation of corrected or normalized gray-scale and single-color images, whereby, without being limited to this example, a mono channel for the gray-scale image and two color channels for a red image and a blue image will be described.

The illumination module 28 is calibrated independently of the line camera 10, for example during final production, in order to be able to flexibly take into account its individual characteristics due to tolerances, batch differences and the like. For example, the illumination module 28 in the production is measured on a sliding table, whereby a number of light-receiving elements or photodiodes distributed laterally, i.e. in the X direction, respectively provides a brightness value for the respective (X, Z) position of the photodiode while being moved at different distances from the illumination module 28. This results in a brightness matrix which, for example, has a resolution of 10×10, i.e. measurements were made at ten distances with ten laterally distributed photodiodes or, alternatively, one photodiode shifted laterally ten times per distance. The resolution may of course differ, in particular the same resolution in the X and Z direction is by no means necessary, but too few values result in an incomplete compensation, while too many values increases unnecessarily the calibration effort.

The brightness matrix 48 of the illumination module 28 obtained in advance in this way is stored in a preferably non-volatile memory of the illumination module 28 (EEPROM) and is a starting point of the flow chart in FIG. 7. For the actual application, preferably the illumination module 28 is connected to the line camera 10 already at the operating location. There is no need to determine beforehand which illumination module 28 will be used in which line camera 10 since the two devices can flexibly make themselves known to each other.

As a first adjustment step, not shown in FIG. 7, in the line camera 10 different gain factors may be used in the mono channel and in the two color channels, i.e. $gain_{color,i} = k_i \, gain_{mono}$ with $k_i > 1$. A differentiation of the color channels among each other is optional, i.e. $k_i = k$ can be valid for all i color channels. In doing so, the mono channel and color channels already reach a similar dynamic range. If on the hardware side it is possible with the image sensor 18, such as separate white and color lines, the different gain that occurs is already analog and thus achieves better signal-to-noise characteristics. Alternatively or additionally, digital gains are possible. Pure digital gain factors may in a simplistic way be multiplied in the presented correction matrices of the color channels.

For a brightness adjustment, the line camera 10 now reads out the brightness matrix 48 stored in the illumination module 28 in a mono channel refinement 50. Using optical parameters such as focal length, aperture and the like, a refined mono channel brightness matrix 52 is calculated which contains significantly more entries than the original brightness matrix 48. The mono channel brightness matrix 52 compensates for inhomogeneities in the illumination of this individual illumination module 28 along the line axis or X-axis and along the Z-axis, due to the decrease in intensity with increasing distance. In doing so, a white adjustment for the mono channel or the gray-scale image is achieved.

Figure 8:
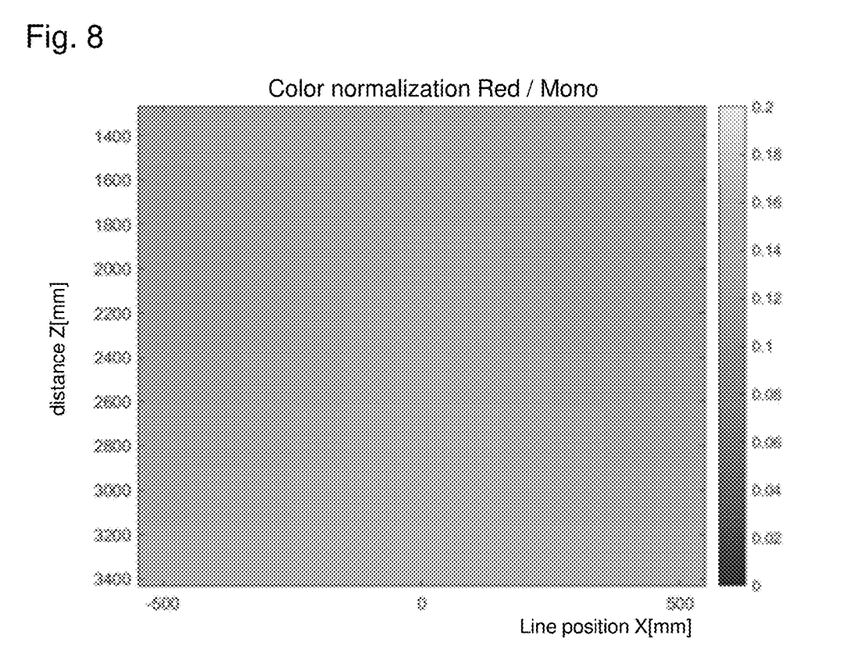
FIG. 8 an exemplary color normalization matrix for red.
Figure 9:
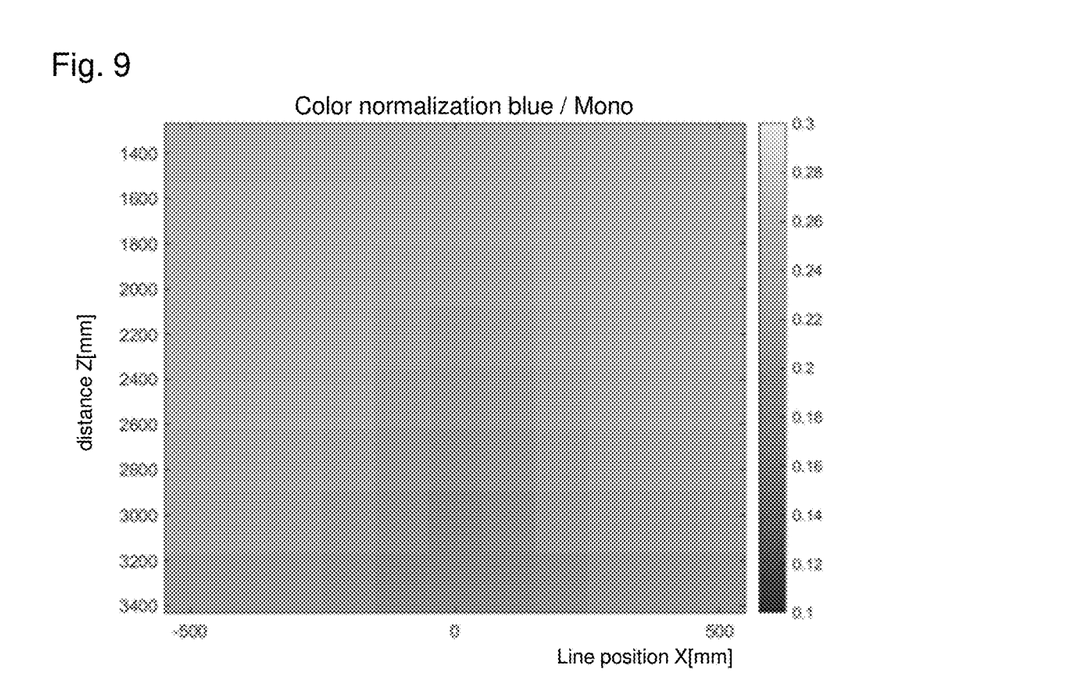
FIG. 9 an exemplary color normalization matrix for blue.

In the color channels, the spectral differences are also to be taken into account. For this purpose, additional color normalization matrices 54, 56 are used. Color normalization matrices 54, 56 have the same dimensions X, Z as the brightness matrix 48 but can differ in their resolution, which is then compensated for, for example, by interpolation. FIG. 8 shows an example of a color normalization matrix 54 for red and FIG. 9 shows an example of a color normalization matrix 56 for blue. To obtain these color normalization matrices 54, 56, spectrometer measurements of the illumination module 28 are performed, and then the ratio of the intensity in the respective color red or blue to the intensity over the entire spectrum is formed for each (X, Z) position. Graphically, a color normalization matrix 54, 56 indicates a spatially resolved distribution, which proportion of the total intensity the associated color has. Preferably, color normalization matrices 54, 56 are not determined individually for each illumination module 28, but rather once for a type or a series of illumination modules 28. They are then known independent of production and may optionally be stored in the illumination module 28 or the line camera 10, for example as a table (LUT, look-up table).

In a combination step 58, the color normalization matrices 54, 56 are mixed with the brightness matrix 48 for each color channel. In addition, in a simple advantageous implementation, the individual entries can be multiplied with each other, provided that all the matrices 48, 54, 56 are or will be suitably normalized. Alternatively, a more complex combined calculation is performed, which may also include a resolution adjustment of the matrices 48, 54, 56.

The respective resulting compensation matrices are then subjected to a color channel refinement 60. For this, the same algorithm may be used as in the mono channel refinement 50, or color-specific properties are taken into account which modify the algorithm for the color channels collectively or even for individual color channels. The result are refined color channel brightness matrices 62, 64 for the blue or red color channels. In doing so, a white adjustment is now also achieved for the color channels and thus the single-color images. The refined brightness matrices 52, 62, 64 only have to be calculated once, for example, during commissioning or for a connection between an illumination module 28 and a line camera 10.

In the brightness correction in the mono channel and color channels explained with reference to FIG. 7, the brightness matrix 48 is recorded independent of spectral characteristics, and color-specific adjustments are made by the color normalization matrices 54, 56. Alternatively, it is conceivable to record the brightness matrix 48 directly in different colors and thus store it in the illumination module 28. Then, different brightness matrices 48 are generated for the mono channel and each color channel. The information of the color normalization matrices 54, 56 is already contained therein, and the combination step 58 may be omitted. For this purpose, in particular for the measurement of the illumination module 28, light-receivers or photodiodes with appropriate color filters can be used, instead of photodiodes sensitive to white light, as above. The color normalization is then actually performed individually for the illumination module 28 instead of, up till now, generally for a type or a series.

Figure 10:
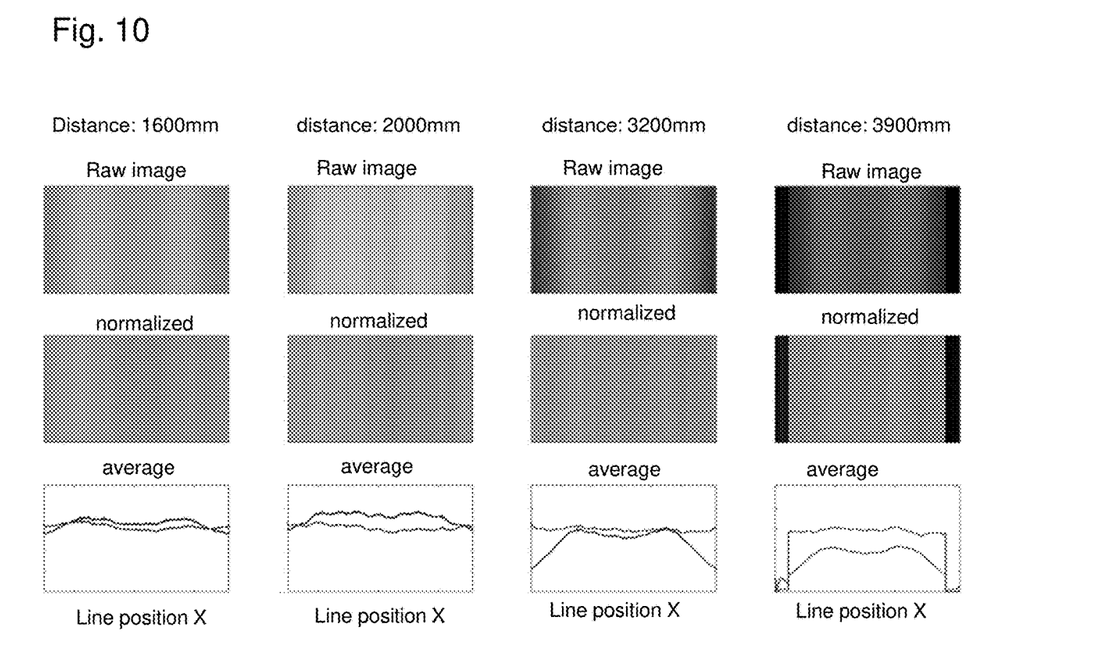
FIG. 10 example images at different distances before and after normalization for the mono channel of the gray-scale image.
Figure 11:
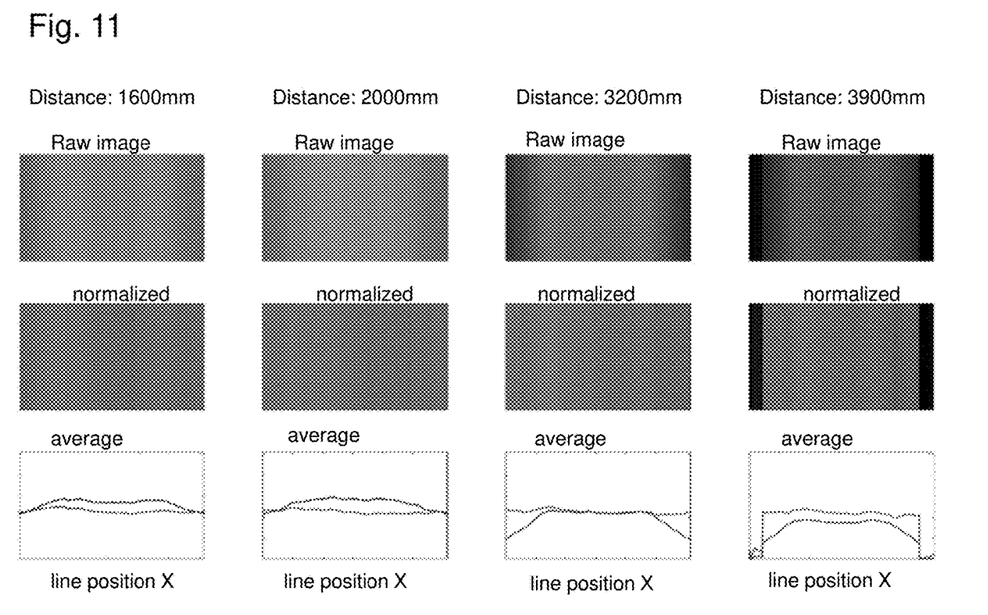
FIG. 11 example images at different distances before and after normalization for the red-color channel of the red image.
Figure 12:
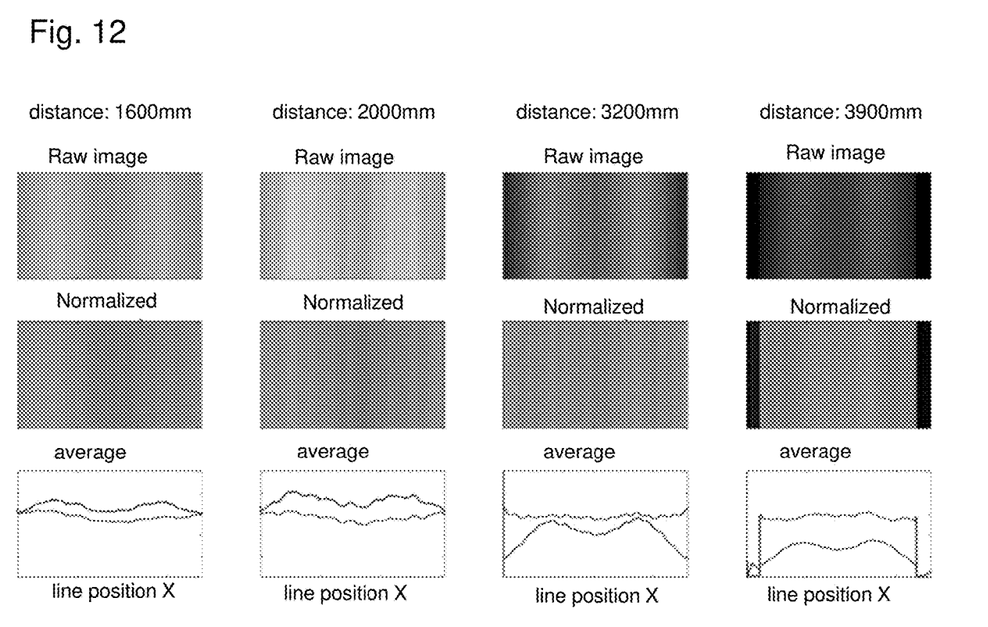
FIG. 12 example images at different distances before and after normalization for the blue-color channel of the blue image.

FIGS. 10 to 12 illustrate the result achieved so far of normalized white, red and blue values. The figures are respectively structured in the same way, whereby FIG. 10 illustrates the monochrome channel, FIG. 11 the red channel and FIG. 12 the blue channel. Here, compared to the monochrome channel, the red and blue channels are increased beforehand by a gain factor of about three. In the columns, the distance or Z-direction is varied. The upper line shows a raw image with the line position X on the X-axis and various consecutively recorded lines on the Y-axis. The second line shows the corresponding result in the form of a normalized image. The bottom line shows an average over the image lines of the raw image compared to an average over the image lines of the normalized image. The somewhat lighter drawn line of the normalized image runs at least approximately flat; thus, the normalization has leveled as desired the irregular progressions of the darker line of the raw image.

Figure 13:
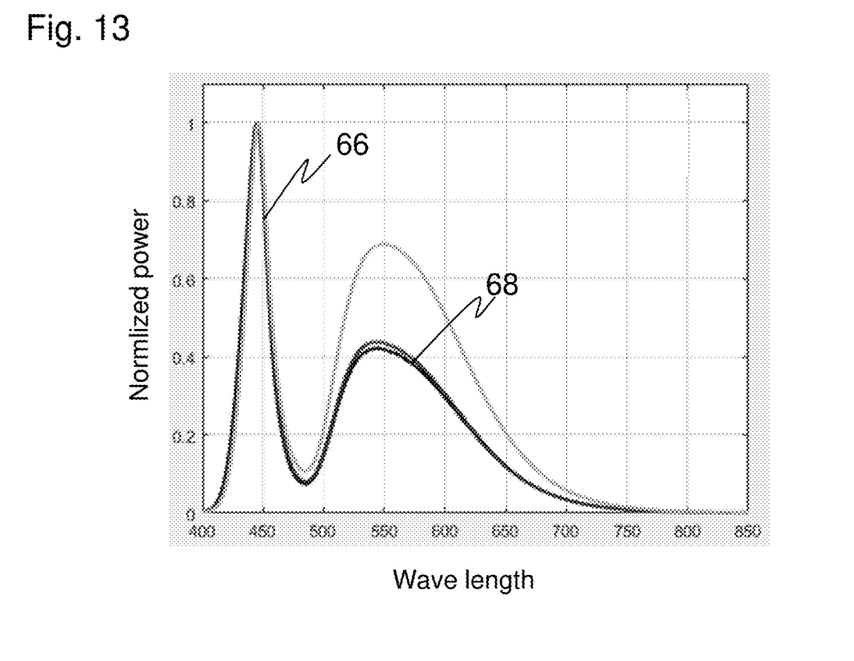
FIG. 13 an exemplary spectrum of an illumination module for different distances.
Figure 14:
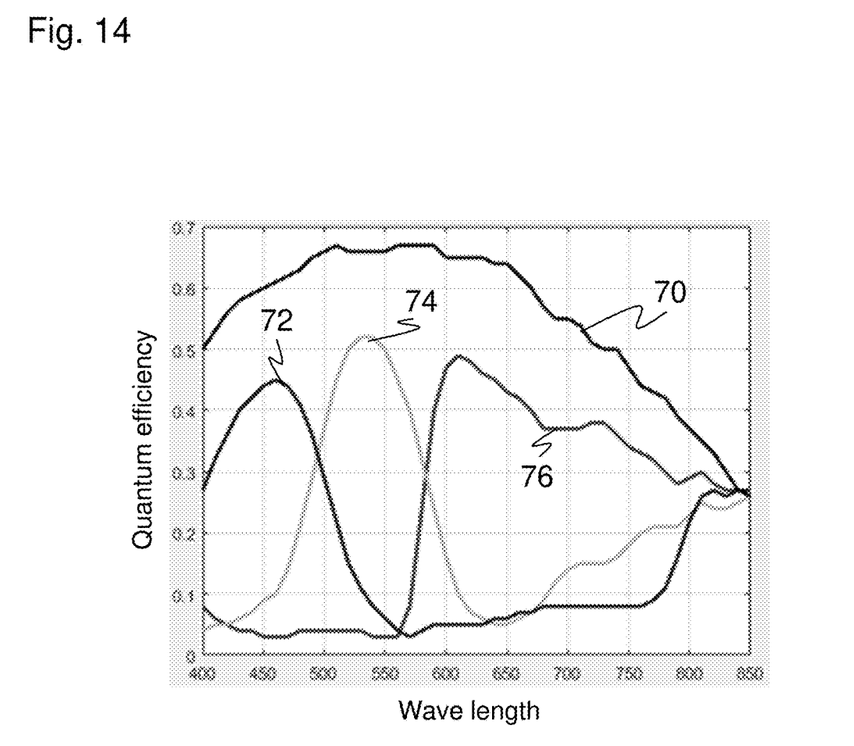
FIG. 14 an exemplary illustration of the quantum efficiency of light-receiving pixels for different colors.

The image data normalized in this way may be used as input data for further color normalization and color reconstruction. FIG. 13 shows firstly an exemplary illumination spectrum of an illumination module 28. A peak 66 for blue and a peak 68 for red are clearly recognizable. The multiple lines result from the fact that the illumination spectrum is distance-dependent due to the dispersion of the optics. FIG. 14 shows complementary exemplary quantum efficiencies of color filters for receiving-pixels 22 with a white characteristic curve 70, a blue characteristic curve 72, a green characteristic curve 74 and a red characteristic curve 76.

In a wavelength range of around 480 nm, a local minimum is found in the illumination spectrum of FIG. 13. According to the example in FIG. 14, this is where the transmission window of a green filter would be typically found. Therefore, a blue and a red color channel, which provide similar intensities on a white target, are preferably used and not a green color channel. In this way, the dynamic range is better utilized, and a better signal-to-noise ratio is achieved.

When a blue and a red color channel are chosen, image data is determined in two primary colors only. If a representation of the color in RGB values is desired, the missing color green may be reconstructed from a function $f(W, R, B)$ and for the first time from $G = 3*W - R - B$. However, this is still not sufficient for a good color reproduction since the illumination spectrum is inhomogeneous and has a local minimum in the green wavelength range. A certain compensation has been made by the normalizations described above. For a result that is as true to the color as possible, preferably correlations between R, B and W are now determined and used. These are, for example, linear combinations of the form $$R'=x_1*R+x_2*(3*W-R-B)+x_3*B+x_4$$

$$G'=x_5*R+x_6*(3*W-R-B)+x_7*B+x_8$$

$$B'=x_9*R+x_{10}*(3*W-R-B)+x_{11}*B+x_{12}$$

with correlation or weighting factors $x_1 \ldots x_{12}$

The weighting factors $x_1 \ldots x_{12}$ are empirically determined and are static. For color channels other than blue and red without green, appropriate corrections are possible.

The weighting factors allow for a color reproduction despite the local minimum in the green spectrum shown in FIG. 13. To illustrate, one can imagine that the line camera 10 is recording a green target. In the blue channel, as in the red channel, almost no green light is allowed through, and the recorded intensity is close to zero. In the mono channel, see the exemplary white characteristic line 70 in FIG. 14, the little amount of existing green light allowed through, results in an intensity slightly above zero. A high value $x_6$ in combination with corrected values $x_5$ and $x_7$ can reconstruct the green value G'. With an alternative black target, no significant intensity would be detected in any channel, which does not change the factors $x_5$. $x_7$ in the equation for G', so that quite correctly, a green value close to zero is reconstructed. Here, it can be seen that the offset values $x_4$, $x_8$, $x_{12}$ are reasonably chosen not to be too large or to be even at zero. With a gray target, both color channels give a certain signal and reconstruct a certain green value G', which in sum results in the RGB color gray as desired.

Alternatively or in addition to the presented weighting factors, a neural network, in particular with multiple hidden levels, is used. As an input, a raw or pre-corrected color vector is defined, and the neural network returns a corrected color vector. Such a neural network can be trained, for example, with an additional color sensor that specifies the colors to teach-in in a supervised learning for training-images. In addition, algorithms or neural networks may be used to improve the signal-to-noise behavior by taking into account the color values of the neighboring pixels.

What is claimed is:

1. A method for brightness and color correction of image data of a line camera, wherein for detecting the image data with at least two line arrays of the line camera under illumination of a detection area of the line camera with an illumination module, a gray-scale image and at least two single-color images are recorded and the image data is corrected with the help of a brightness function of the illumination module which is dependent on a line position of the line array and/or a distance of recorded objects wherein the brightness function is determined for the illumination module in advance and independent of the line camera and is stored in the illumination module, and the brightness function is read out by the line camera and is used for the respective correction of the gray-scale image and the single-color images.

2. The method according to claim 1, wherein the line camera is a line camera for code reading.

3. The method according to claim 1, wherein the gray-scale image is used for the reading of codes.

4. The method according to claim 1, wherein a color image is generated from the single-color images.

5. The method according to claim 4, wherein the color image is used in particular to identify code-carrying objects and/or code regions, to classify them and/or to differentiate them from the image background.

6. The method according to claim 1, wherein the brightness function is respectively modified by a color normalization function for the color of the single-color image, so that the correction of the gray-scale image and the single-color images is respectively carried out with its own brightness function, wherein a color normalization function sets for different line positions and distances the brightness of the illumination module for its color in proportion to the brightness over the entire spectrum.

7. The method according to claim 6, wherein the color normalization functions are determined in advance generally for the type of illumination module.

8. The method according to claim 6, wherein the color normalization functions are determined in advance individually for the illumination module, in particular with the brightness function.

9. The method according to claim 6, wherein the color normalization functions are determined in advance individually for the illumination module with the brightness function.

10. The method according to claim 1, wherein the brightness function is refined based on optical parameters of the line camera.

11. The method according to claim 1, wherein the gray-scale image and the single-color images are recorded with different analog and/or digital gains.

12. The method according to claim 1, wherein two single-color images are recorded in two of three primary colors.

13. The method according to claim 12, wherein the third primary color is reconstructed from the gray-scale image and the two single-color images.

14. The method according to claim 12, wherein the two primary colors are red and blue.

15. The method according to claim 1, wherein corrected color values of a color image are formed from linear combinations of respective gray values of the gray-scale image and single-color values of the single-color images with color correcting weighting factors.

16. The method according to claim 15, wherein corrected RGB-values R'G'B' are formed as a gray-scale image with gray values W, a red image with red values R and a blue image with blue values B are formed as $$R'=x_1*R+x_2*(3*W-R-B)+x_3*B+x_4$$

$$G'=x_5*R+x_6*(3*W-R-B)+x_7*B+x_8$$

$$B'=x_9*R+x_{10}*(3*W-R-B)+x_{11}*B+x_{12}$$

with weighting factors $x_1 \ldots x_{12}$.

17. The method according to claim 15, wherein the corrected color values are determined with a neural network, which is learned-in based on color images of at least one further color-sensitive sensor.

18. A camera which comprises a line-shaped image sensor with at least two line arrays of light-receiving pixels for recording image data, and a control and evaluation unit for processing the image data, wherein the line arrays form a mono channel whose light-receiving pixels are sensitive to white light for recording a gray-scale image, and at least two color channels whose light-receiving pixels are respectively sensitive only to light in the color of its color channel, wherein the control and evaluation unit is configured so as to correct the image data in brightness and color according to the method of claim 1.

19. The camera according to claim 18, wherein the camera is a code reader for reading an optical code.

\* \* \* \* \*